US011856110B2

(12) United States Patent
Chen et al.

(10) Patent No.: US 11,856,110 B2
(45) Date of Patent: Dec. 26, 2023

(54) METHOD FOR DELEGATED KEY SHARING FOR DIGITAL CAR KEY SYSTEM

(71) Applicant: GM Global Technology Operations LLC, Detroit, MI (US)

(72) Inventors: Jinzhu Chen, Troy, MI (US); Fan Bai, Ann Arbor, MI (US); John Sergakis, Bloomfield Hills, MI (US); Thomas E. Utter, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 323 days.

(21) Appl. No.: 17/154,181

(22) Filed: Jan. 21, 2021

(65) Prior Publication Data

US 2022/0231862 A1 Jul. 21, 2022

(51) Int. Cl.
*H04L 9/32* (2006.01)
*H04W 4/44* (2018.01)
*B60R 25/01* (2013.01)
*B60R 25/24* (2013.01)

(52) U.S. Cl.
CPC ............ *H04L 9/3263* (2013.01); *B60R 25/01* (2013.01); *B60R 25/24* (2013.01); *H04L 9/3247* (2013.01); *H04W 4/44* (2018.02)

(58) Field of Classification Search
CPC . H04L 9/3263; H04L 9/3247; H04L 2209/84; H04L 9/088; H04L 9/3268; H04L 9/0897; B60R 25/01; B60R 25/24; H04W 4/44; H04W 12/0471; H04W 12/069; G06F 21/64; G07C 9/00309; G07C 9/00571
See application file for complete search history.

(56) References Cited

U.S. PATENT DOCUMENTS

| | | |
|---|---|---|
| 11,586,990 B2 * | 2/2023 | Sakurada ............... G06Q 10/02 |
| 2016/0019738 A1 * | 1/2016 | Kim .................... G07C 9/00182 |
| | | 340/5.22 |
| 2016/0217635 A1 * | 7/2016 | Pudar ................. G07C 9/00571 |
| 2017/0104589 A1 * | 4/2017 | Lambert ............... H04L 9/3268 |
| 2018/0007021 A1 * | 1/2018 | Deriso ................ H04L 63/0442 |
| 2018/0232394 A1 * | 8/2018 | Danziger ............. G06F 16/1873 |
| 2018/0357846 A1 * | 12/2018 | Chen ..................... B60R 25/241 |
| 2019/0318275 A1 * | 10/2019 | Sakurada ........... G01C 21/3438 |

* cited by examiner

*Primary Examiner* — Mohammed Waliullah
(74) *Attorney, Agent, or Firm* — CANTOR COLBURN LLP

(57) ABSTRACT

A system and method for sharing a digital key for a vehicle. The system includes a first digital key device having a digital key stored thereon, a second digital key device, and a vehicle server. The first digital key device sends a request to the vehicle server for a key sharing session. The vehicle server commences a key sharing session in response to the request. The first digital key device shares the digital key to a second digital key device. The vehicle server ends the key sharing session.

18 Claims, 7 Drawing Sheets

METHOD FOR DELEGATED KEY SHARING FOR DIGITAL CAR KEY SYSTEM

INTRODUCTION

The subject disclosure relates to methods for sharing digital keys used to operate vehicles and, in particular, a system and method of preventing authorizing use of a digital key from sharing conflicts.

With the advent of digital key technology, a digital key can be stored in an electronic digital key device, such as a smartphone, etc. and used to operate a vehicle. A digital key is an encoded data or data structure. A person possessing the digital key device brings the digital key device into proximity with the vehicle and the digital key is sent from the digital key device to the vehicle to unlock the vehicle. When the digital key matches a copy of the digital key stored at the vehicle, the vehicle can be used by the person. The digital key can also be shared from one person to another person by transmitting a copy of the digital key from the digital key device to another key device which is possessed by the other person. A potential for sharing conflict occurs when multiple copies of a digital key are stored on multiple digital key devices. Accordingly, it is desirable to provide a method for sharing a digital key without creating sharing conflicts amongst multiple digital key devices.

SUMMARY

In one exemplary embodiment, a method of sharing a digital key for a vehicle is disclosed. A request for a key sharing session is sent from a first digital key device to a vehicle server, the first digital key device having a digital key stored thereon. The key sharing session is commenced at the vehicle server. The digital key is shared from the first digital key device to a second digital key device. The key sharing session is ended at the vehicle server.

In addition to one or more of the features described herein, the method further includes granting, via the vehicle server, exclusive rights to the first digital key device to share the digital key during the key sharing session. The method further includes sharing the digital key by tracking active entitlements for the digital key. In an embodiment in which the first digital key device is a delegate device, the method further includes registering the digital key stored on the delegate key device at the vehicle. The digital key stored on the delegate device includes a certificate including an owner signature from an owner device that entitles the delegate device to share the digital key. Registering the digital key stored on the delegate device at the vehicle further includes verifying the owner signature from the digital key. In an embodiment, the method further includes establishing a digital twin of the first digital key device at a twin server and sharing the digital key using the digital twin at the twin server. The method further includes sending a key sharing request from the twin server to the first digital key device, creating a shared digital key at the first digital key device and sending the shared digital key from the first digital key device to the twin server, wherein the twin server sends the shared digital key to the second digital key device. The method further includes using the shared key at the second digital key device to perform an operation at the vehicle.

In another exemplary embodiment, a system for sharing a digital key for a vehicle is disclosed. The system includes a first digital key device having a digital key stored thereon, a second digital key device, and a vehicle server configured to commence a key sharing session in response to a request from the first digital key device and to end the key sharing session; wherein the first digital key device shares the digital key to the second digital key device during the key sharing session.

In addition to one or more of the features described herein, the vehicle server is configured to grant exclusive rights to the first digital key device to share the digital key during the key sharing session. The vehicle server is configured to track active entitlements for the digital key. In an embodiment, the first digital key device is a delegate device, and the vehicle server is configured to register the digital key stored on the delegate device at the vehicle. The digital key stored on the delegate device includes a certificate including an owner signature from an owner device that entitles the delegate device to share the digital key. The vehicle is configured to register the digital key stored on the delegate device by verifying the owner signature from the digital key. In an embodiment, the system further includes a twin server configured to establish a digital twin of the first digital key device and share the digital key using the digital twin. The twin server is configured to send a key sharing request to the first digital key device and the first digital key device is configured to create a shared digital key and send the shared digital key to the twin server in response to the key sharing request, wherein the twin server sends the shared digital key to the second digital key device. The second digital key device is configured to use the shared key to perform an operation the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
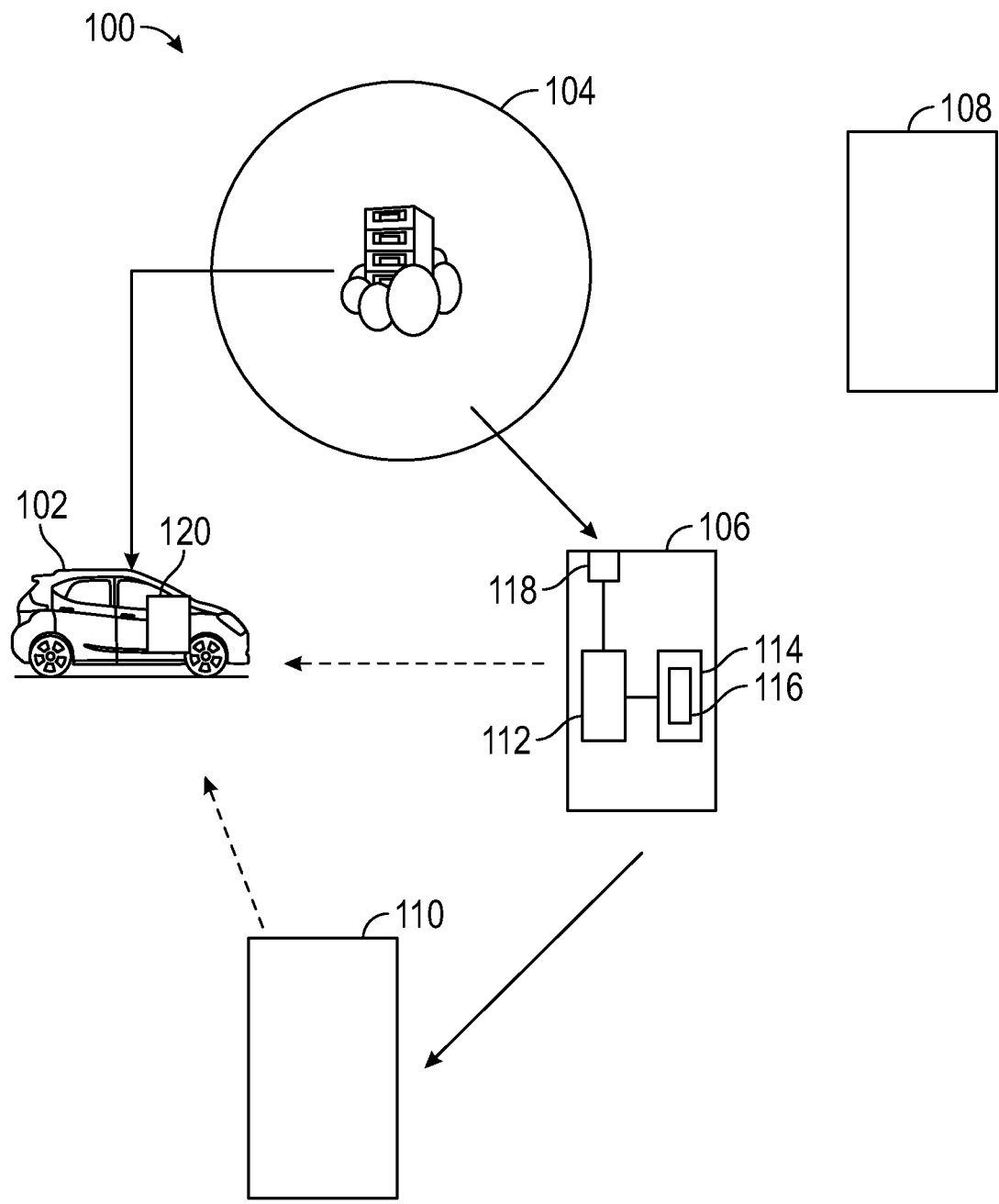
FIG. 1 shows a communication network suitable for operating a vehicle using a digital key, in an illustrative embodiment.

FIG. 1 shows a communication network 100 suitable for operating a vehicle 102 using a digital key, in an illustrative embodiment. The communication network 100 includes the vehicle 102, a vehicle server 104, and multiple digital key devices. The vehicle server 104 can be a remote server or a cloud server and is generally an Original Equipment Manufacturer (OEM) server. The multiple digital key devices include a first owner device 106 and a second owner device 108, for illustrative purposes, as well as a vehicle user device 110. An owner device is generally an original owner and is established as such by having its digital key registered at the vehicle 102 upon purchase of the vehicle. A digital key device is generally a portable device and can be carried to and from the vehicle 102 by a person or user.

For illustrative purposes, first owner device 106 is shown with various operating components. The first owner device 106 can be an electronic device, including but not limited to a smartphone, a tablet, or other electronic device. The first owner device 106 includes a processor 112 and a memory 114, such as a solid-state memory. The digital key 116 can be stored at the memory 114 and accessed by the processor 112 for use. The first owner device 106 further includes a communication port 118 for sending and receiving the digital key 116 or a copy of the digital key to and from other devices. To unlock and operate the vehicle 102, an owner (also referred to herein as "first owner") of the first owner device 106 approaches the vehicle 102 to allow a communication between the first owner device 106 and the vehicle 102. The digital key is then transmitted from the first owner device 106 to the vehicle 102. Upon receiving the digital key from the first owner device 106, a vehicle processor 120 at the vehicle 102 uses cryptographic algorithms to compare the digital key to a stored key and allow operation of the vehicle by the first owner when the digital key matches the stored key. The vehicle server 104 can also transmit its copy of the digital key to the vehicle 102 to unlock and operate the vehicle. The second owner device 108 and the vehicle user device 110 include the components shown with respect to the first owner device 106, although this is not specifically illustrated.

The vehicle server 104, first owner device 106 and second owner device 108 each store a copy of a digital key. In addition, a copy of the digital key can be stored at a user device that has the same sharing capabilities as the first owner device 106 through authorization by the first owner device. Such user device can be referred to herein as a "delegate device". The vehicle user device 110 does not have its own copy of the digital key. However, either of the first owner device 106, the second owner device 108 or delegated device can share its copy of the digital key with the vehicle user device 110 using the methods disclosed herein.

A device having a digital key means that the device stores a digital key pair including a private key and a public key. The device may also have a signature from the owner to authenticate its right to operate the vehicle by the owner. When a first device shares its digital key with a second device, the second device stores a certificate that includes its own public key and a copy of the signature generated by the private key of the first device. Therefore, the second device obtains the authorization from the first device after the digital key has been shared.

A digital key is an encoded electronic data structure that can be used to lock or unlock a vehicle. The digital key can include a certificate indicating authorization from an owner of the digital key to a selected individual. Each digital key can also include an associated entitlement or list of privileges allowed the digital key device or its owner. For example, one digital key device can be entitled to lock and unlock the vehicle. Another digital key device can be entitled to lock and unlock the vehicle as well as to turn on the vehicle and drive. In another example, the digital key device can be entitled to operate only during a selected time frame or time frames. For example, one owner can be allowed to operate the vehicle during weekdays while another user may be allowed to operate the vehicle from noon to 4 p.m. on an assigned day. Thus, the level of entitlement determines the types of operations that can be performed at the vehicle, such as, but not limited to, locking and unlocking, driving the vehicle, time periods in which one can drive the vehicle, parental supervision operations, sharing the digital key, etc.

The vehicle 102 includes a vehicle processor 120 that stores a registered copy of the digital key. When a digital key device, such as the first owner device 106 or the vehicle user device 110, is brought into communicative proximity of the vehicle 102, the vehicle processor 120 reads the digital key stored thereon, runs a cryptographic algorithm to compare the digital key of the digital key device with the registered copy of the digital key and allows the user access to the vehicle once the registered copy matches the read digital key of the digital key device.

The methods disclosed herein provide a method of sharing keys that avoids conflicts and ensures consistency of key sharing privileges and entitlements. Key sharing sessions are set up to provide a systematic key sharing process based on a specific key sharing topology.

Figure 2:
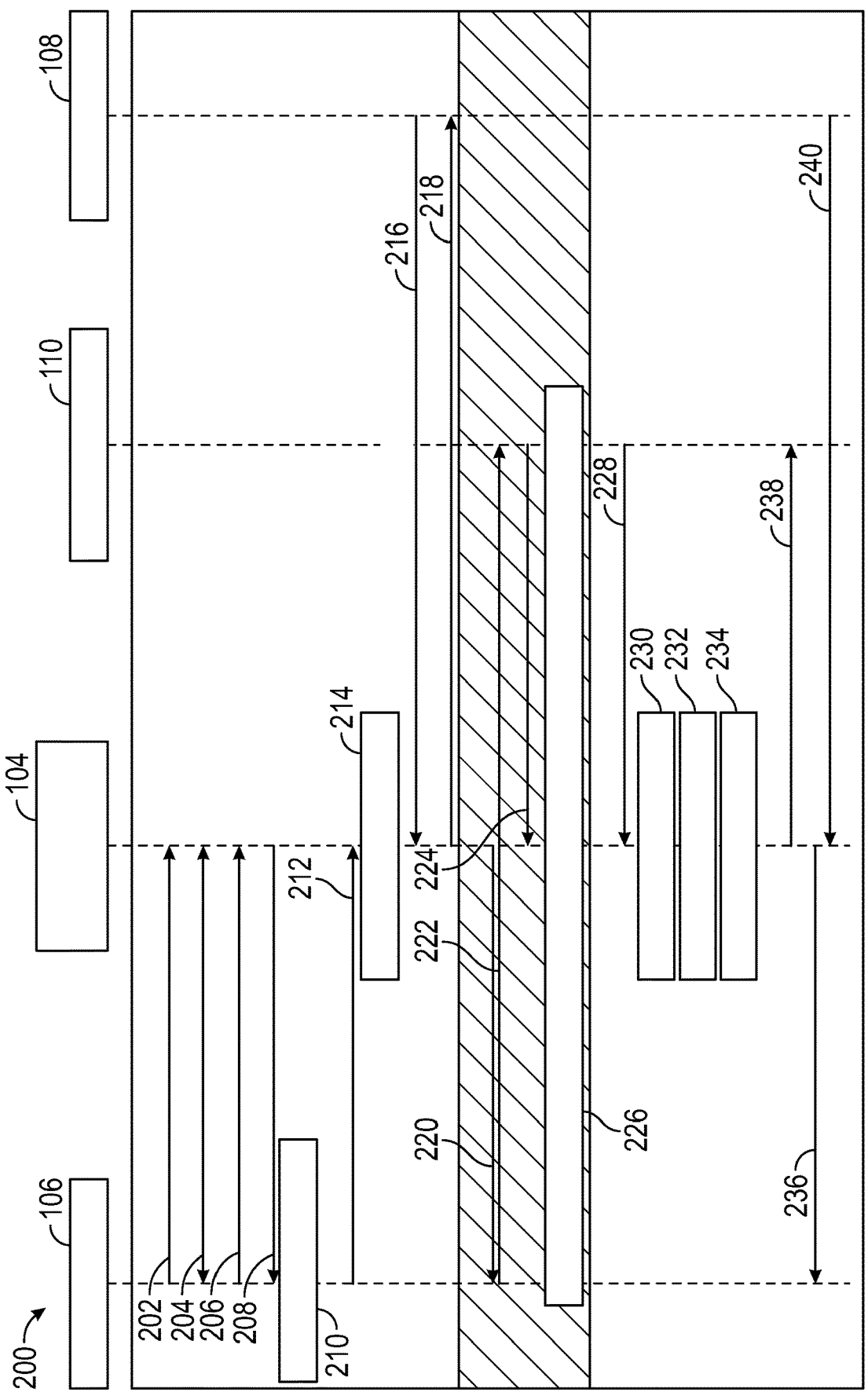
FIG. 2 shows a communication diagram for sharing a key when there are multiple key owners, such as shown in the communication network of FIG. 1.

FIG. 2 shows a communication diagram 200 for sharing a key when there are multiple key owners, such as shown in the communication network 100 of FIG. 1. The process illustrated in the communication diagram 200 allows the multiple key owners to share their respective keys without creating sharing conflicts. Communication is shown between the members of the communication network 100, namely the first owner device 106 (Device A), the vehicle server 104, the vehicle user device 110 and the second owner device 108 (Device B). The first owner device 106 can be a digital key device or a digital key device with its supporting back office. Similarly, the second owner device 108 can be a digital key device or a digital key device with its supporting back office and the vehicle user device 110 can be a digital key device or a digital key device with its supporting back office.

The communication diagram 200 illustrates the first owner device 106 sharing its key with the vehicle user device 110 without creating a sharing conflicted via the second owner device 108. The second owner device can represent a second owner device or a user device that is authorized by the first owner device to share its digital key. The first owner device 106 begins by sending a synchronization request (communication signal 202) to the vehicle server 104 to establish a key synchronization session. The vehicle server 104 responds by sending a secure session signal (communication signal 204) back to the first owner device 106.

The first owner device 106 then sends a list of entitlements (communication signal 206) to the vehicle server 104. The list of entitlements is a set of entitlements known by the first owner device 106 with respect to the vehicle 102. The vehicle server 104 responds by sending a list of active entitlements (communication signal 208) for the vehicle to the first owner device 106. The first owner device 106 does not necessarily know all the active entitlements before this communication. The list of active entitlements can form a schedule of sharing entitlements for the vehicle. The first owner device 106 then reviews the list of active entitlements on the schedule and generates a sharing entitlement (box 210) that does not conflict with the existing active entitlements on the schedule.

The first owner device 106 then sends a request (communication signal 212) for a key sharing session to the vehicle server 104. Upon receiving the request, the vehicle server 104 creates a locked session (box 214) for the first owner device 106. The locked session (box 214) allows the first owner device 106 to share its digital key with the vehicle user device 110 without being interrupted by another owner device.

For illustrative purposes, the second owner device 108 is shown sending a request (communication signal 216) for a key synchronization session after the locked session (box 214) has already been created. Since the first owner device 106 and the vehicle server 104 are in a locked session, the vehicle server 104 sends a busy signal (communication signal 218) back to the second owner device 108.

Once the locked session (box 214) has been created, the first owner device 106 can share its digital key with the vehicle user device 110. The vehicle server 104 sends a sharing session signal (communication signal 220) to the first owner device 106 indicating that the locked session has been created. The first owner device 106 then sends a sharing URL (communication signal 222) to the vehicle user device 110. The URL can have information attached. The vehicle user selects the URL to redeem the key. Once the URL is selected, the vehicle user device 110 sends a redemption request (communication signal 224) for the shared key to the vehicle server 104. The first owner device 106 or vehicle server 104 then creates a sharing key (box 226) for the vehicle user device 110.

The vehicle user device 110 then sends a track key signal (communication signal 228) to the vehicle server 104. The track key signal includes the authorization of the vehicle user device 110. The vehicle server 104 reviews and validates the authorization of the vehicle user device 110 (box 230). The vehicle server 104 then validates the entitlement of the vehicle user device 110 (box 232) to be certain that there are no conflicts with other owners or user devices. The vehicle server 104 then unlocks the session (box 234) and sends notifications (communication signals 238 and 236) to the vehicle user device 110 and the first owner device 106, respectively, that the tracking session has ended. As shown for illustrative purposes, the second owner device 108 can now request a key synchronization request (communication signal 240) to the vehicle server 104 without receiving a busy signal.

As shown in FIG. 2, sharing can be performed between an owner device and a vehicle user device without sharing conflicts. However, a key network can also include an intermediate device between the owner device and vehicle user device. The intermediate device, also referred to as a delegate device, can receive a copy of the digital key from the owner device and as well as an entitlement, bestowed on it by the owner device, to share its copy of the digital key with another device, such as the vehicle user device.

Figure 3:
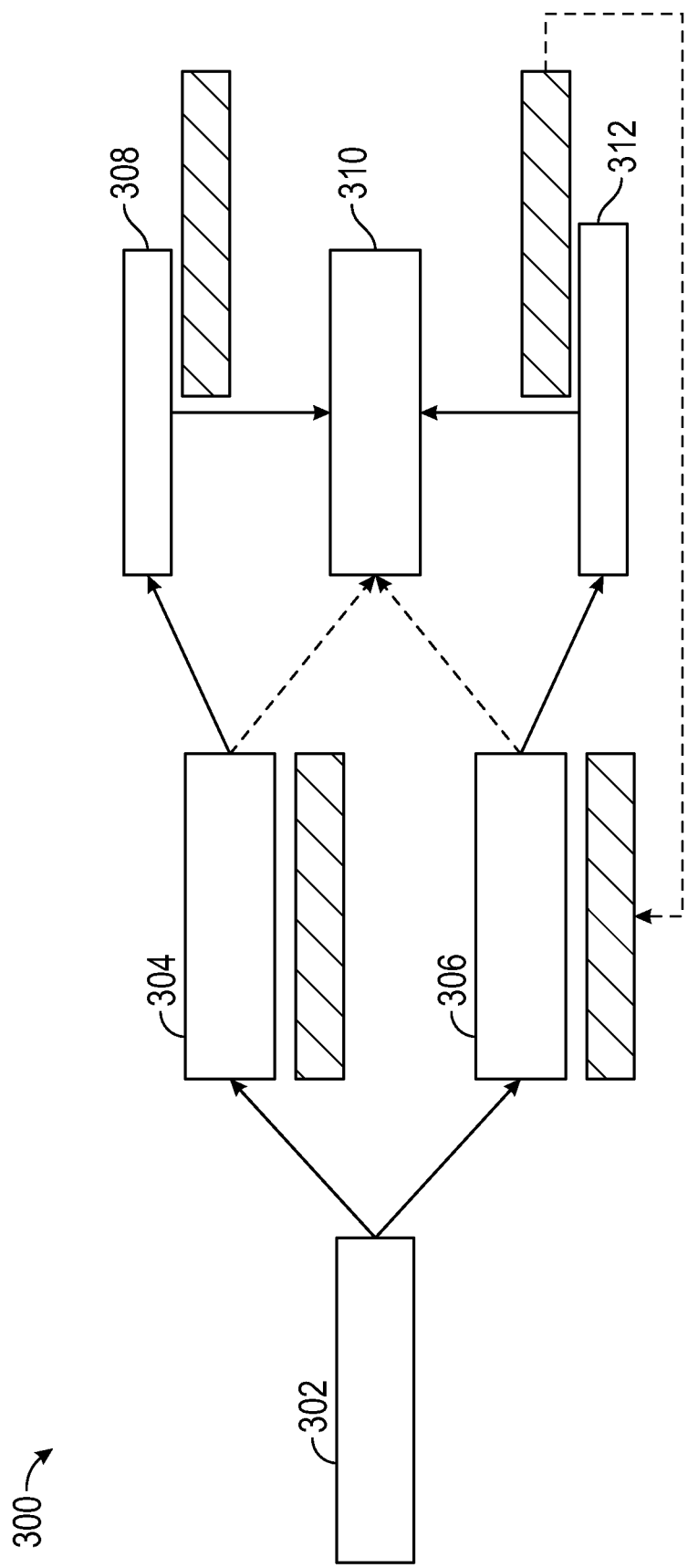
FIG. 3 illustrates a key sharing network that includes an owner device, one or more delegate entities and one or more vehicle user devices.

FIG. 3 illustrates a key sharing network 300 that includes an owner device, one or more delegate entities and one or more vehicle user devices. The one or more delegate entities can be a delegate server 304 (or a server having delegate entitlements) or a delegate device 306 (or a digital key device having delegate entitlements). The owner device 302 can share the digital key with the delegate entities. A digital key stored on a delegate entity is referred to herein as a delegate key. The delegate key also has the same entitlements as the digital key as well as sharing privileges. Thus, the delegate entities can perform an operation to use its delegated key to share a digital key with a vehicle user, using the methods disclosed herein.

The owner device 302 stores a digital key pair that consists of a private digital key (e.g. A.sk) and a public key (e.g., A.pk) where the public key is registered with the vehicle 102. When the owner device 302 shares its digital key with the delegate server 304. The delegate server 304 stores a certificate including a public key (B.pk) and a signature signed by the private key (A.sk) of owner device 302, which authenticates the public digital key (B.pk). Similarly, the owner device 302 can share its digital key with the delegate device 306 which then stores a certificate including a public key (C.pk) and a signature signed by the private key (A.sk) of the owner device 302, which authenticates the public digital key (C.pk).

The delegate server 304 is shown sharing its digital key to a first vehicle user device (e.g., P2P vehicle user device 308). The delegate server 304 shares its digital key with the P2P vehicle user device 308 by providing a certificate that includes the public key (D.pk) of the P2P vehicle user device 308 and a signature from the private key (B.sk) of the delegate server 304. Similarly, the delegate device 306 is shown sharing its digital key to a second vehicle user device (e.g., friend vehicle user device 312) by providing a certificate that includes the public key (E.pk) of the friend vehicle user device 312 and a signature from the private key (E.pk) of the delegate device 306. The eventual vehicle user device therefore includes a digital key with a chain of certificates extending back to the owner device 302, which allows the vehicle to verify the digital key. In order for either of the delegate entities (i.e., delegate server 304, delegate device 306) to share its delegate key, it needs to register its delegate key with the vehicle 310 or the vehicle 310 needs to verify the chain of the certificates.

Figure 4:
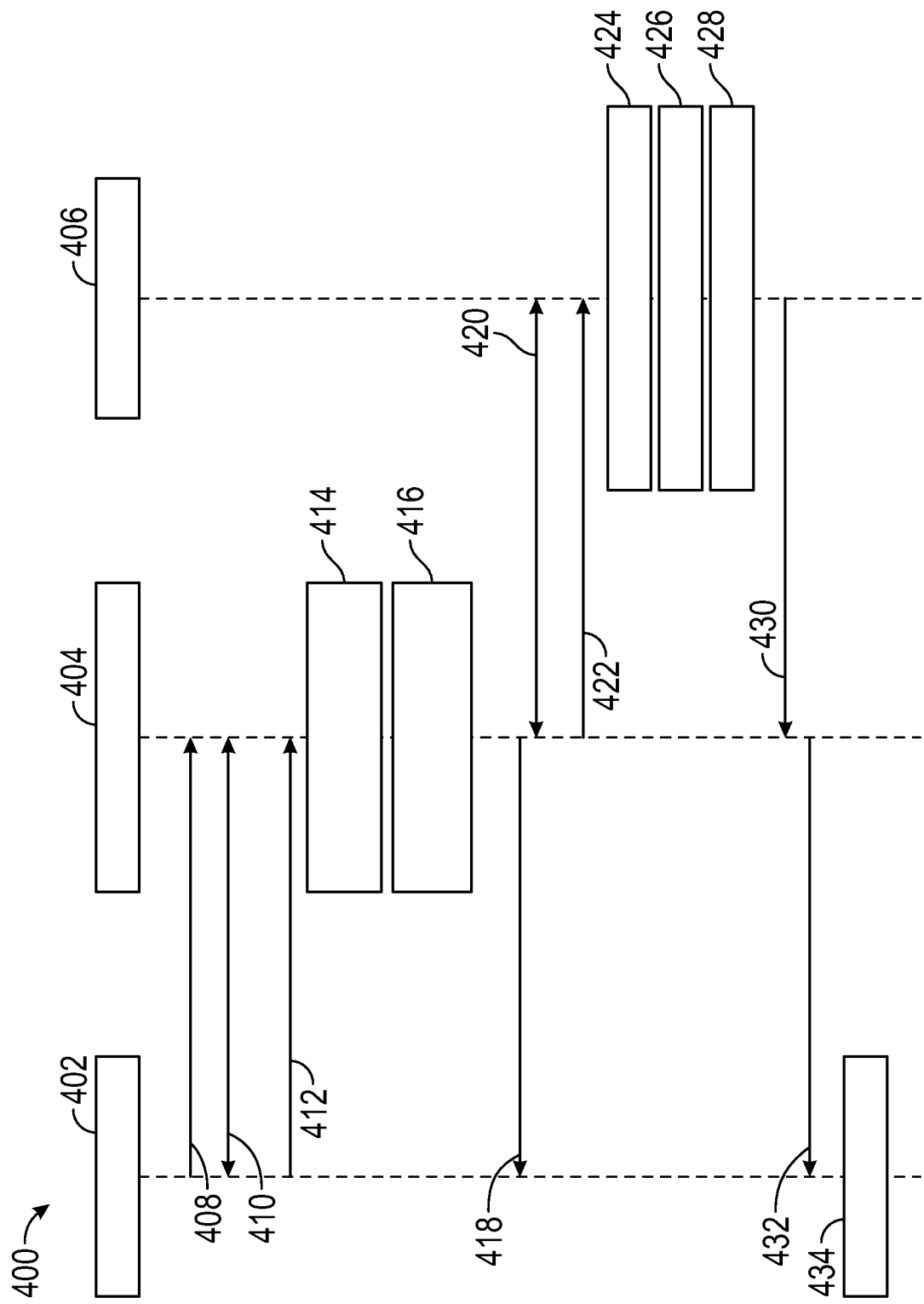
FIG. 4 shows a communication diagram that allows a delegate entity to remotely register its digital key at a vehicle.

FIG. 4 shows a communication diagram 400 that allows a delegate entity 402 to remotely register its digital key at a vehicle 406. The communication diagram 400 includes the delegate entity 402, a vehicle server 404 and the vehicle 406.

The delegate entity 402 sends a remote registration request (communication signal 408) to the vehicle server 404. The vehicle server 404 responds by establishing a secure link (communication signal 410) with the delegate entity 402. The delegate entity 402 then sends its delegate key certificate (communication signal 412) to the vehicle server 404. Each delegate key includes a key certificate that shows a chain back to the owner device 302, FIG. 3. The key certificate includes a chain of certificate. When the owner creates the delegate key certificate, the owner device signs the delegate key, thereby providing a means for authenticating the delegate key certificate.

The vehicle server 404 extracts the owner key certificate from the delegate key certificate (box 414). The vehicle server 404 then verifies the owner key certificate and the entitlement allowed to the delegate entity 402 (box 416).

Once the owner key certificate and the entitlement of the delegate device have been verified, the vehicle server 404 sends a notification (communication signal 418) to the delegate entity 402 to let the delegate entity 402 know that a registration session has begun. The vehicle server 404 then sends a request (communication signal 420) to establish a secure link with the vehicle 406. The vehicle server 404 then sends the delegate key certificate (communication signal 422) to the vehicle 406 for installation at the vehicle 406.

The vehicle already has a copy of the owner certificate. The vehicle 406 verifies (box 424) the owner signature from the delegate key certificate. The vehicle then verifies (box 426) the entitlements of the delegate, including the entitlement of the delegate to share its digital key. The vehicle 406 then stores (box 428) the delegate key. Once the delegate key is stored at the vehicle 406, the vehicle sends a success signal (communication signal 430) to the vehicle server 404, which then sends a notification (communication signal 432) to the delegate entity 402 that the delegate key has been installed at the vehicle 406. The delegate entity 402 is now able to share its delegate key with a vehicle user device (box 434).

Figure 5:
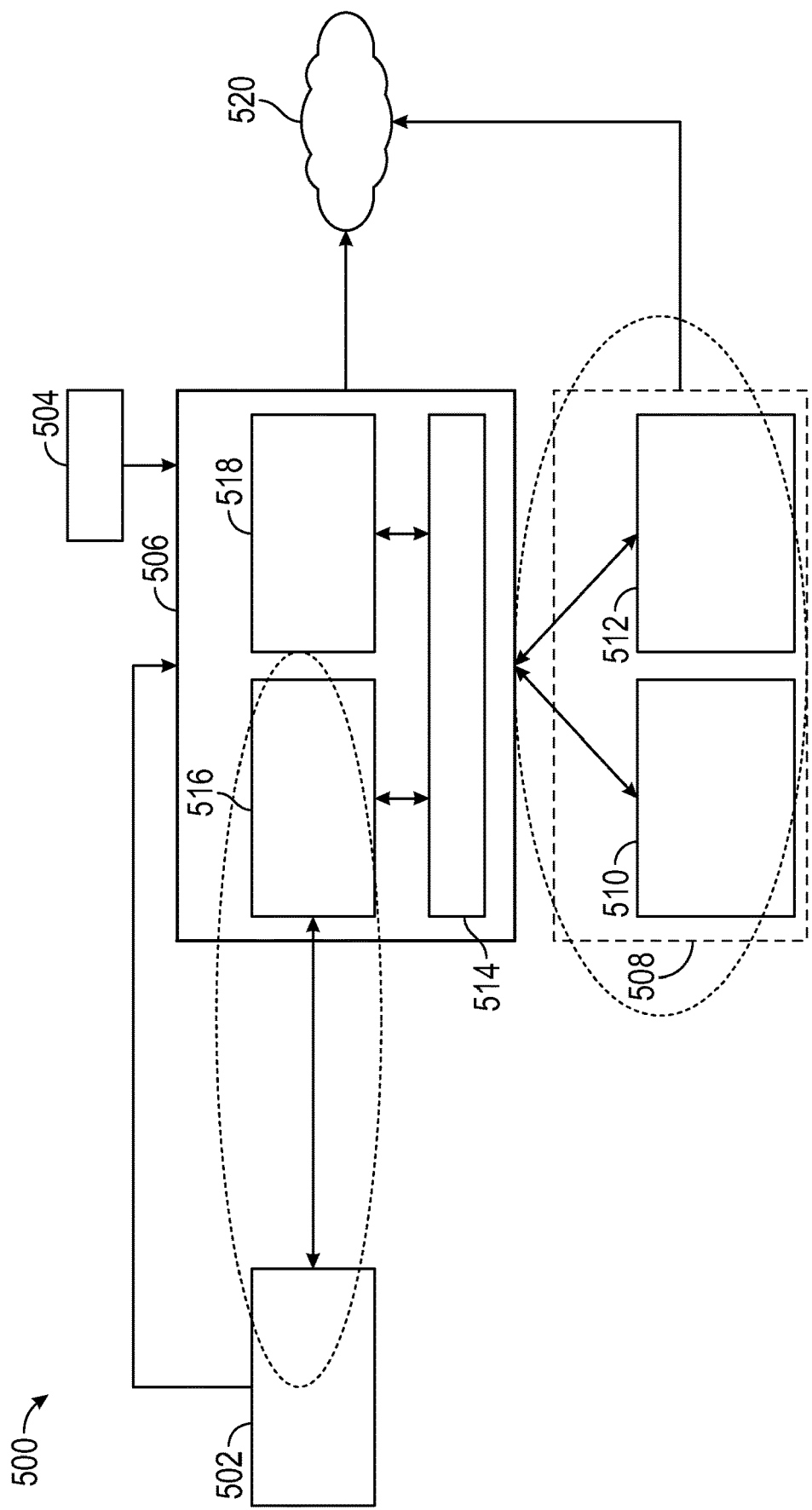
FIG. 5 shows a network enabling an owner device or an owner device with its supporting back office server to share its digital key using a twin server.

FIG. 5 shows a network 500 enabling an owner device 502 or an owner device with its supporting back office server to share its digital key using a twin server 506. The network 500 includes the owner device 502, a vehicle server 504, the twin server 506 and a delegate entity 508. The delegate entity can be a delegate server 510 (e.g., a fleet management server) or a delegate device 512, in various embodiments. The twin server 506 is a server that stores the digital twin, a virtual copy of the owner device 502 or of the software of the owner device 502. During the sharing process, a delegate entity 508 can be enrolled at the twin server 506 as an intermediary device. The twin server 506 includes a server interface 514 for communication with the delegate entity 508 as well as a digital twin 516 and an owner user authentication module 518. The twin server 506 communicates with the owner device 502 in order to create the digital twin 516 of the owner device 502 or the software of the owner device 502. The delegate entity 508 then establishes rights to access the digital twin through the twin server.

Figure 6:
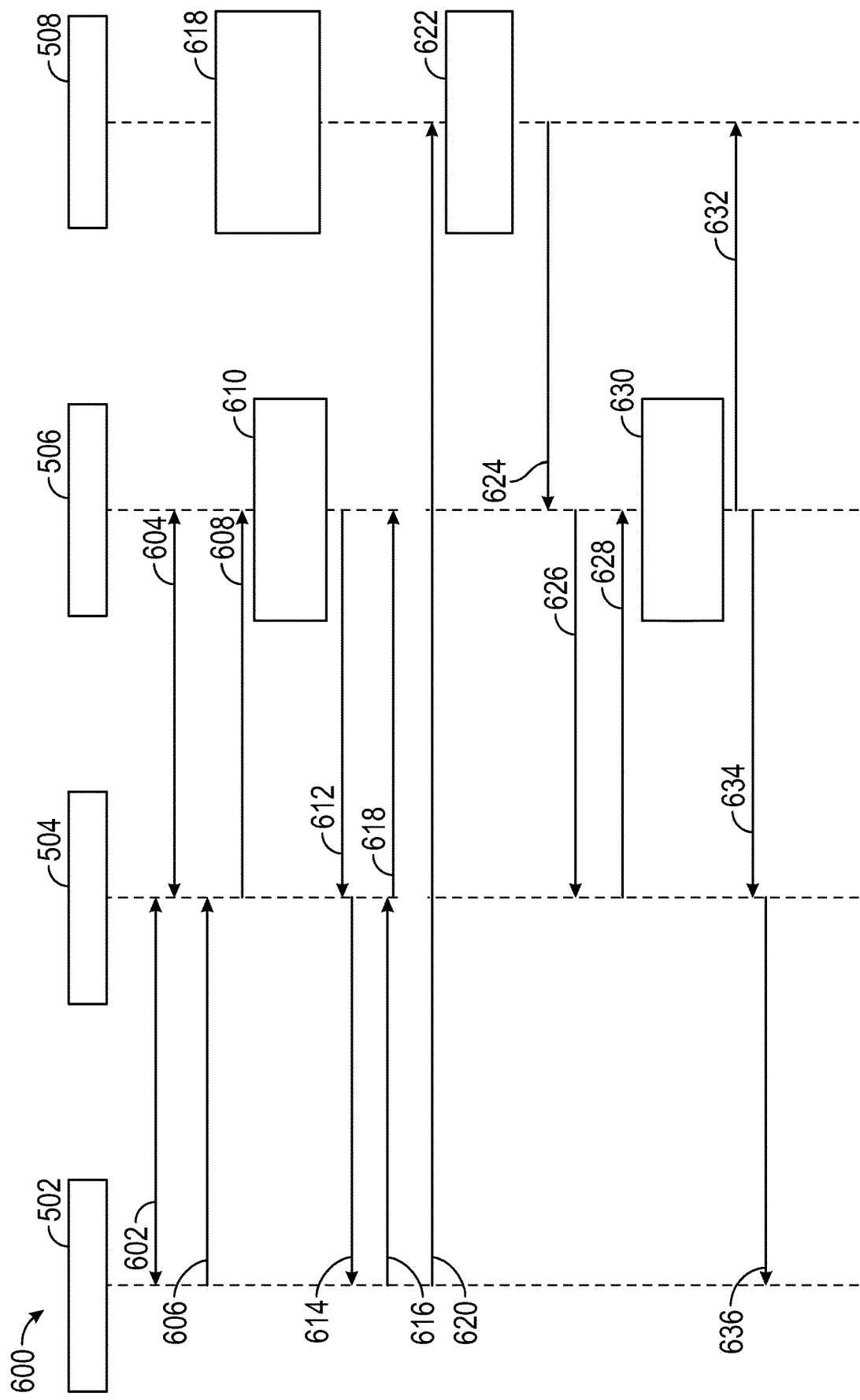
FIG. 6 shows a communication diagram for enrolling the delegate entity at a twin server to facilitate the sharing of a digital key, in an illustrative embodiment.

FIG. 6 shows a communication diagram 600 for enrolling the delegate entity 508 at a twin server to facilitate the sharing of a digital key, in an illustrative embodiment. The owner device 502 establishes a session with the twin server 506 to allow the delegate entity 508 to enroll at the twin server 506. To set up a twin session, the owner device 502 establishes a secure link (communication signal 602) with the vehicle server 504, which then establishes a secure link (communication signal 604) with the twin server 506. The owner device 502 then sends a session request (communication signal 606) to the vehicle server 504, which establishes a twin session with the twin server 506 (communication signal 608). The twin server 506 creates a digital twin instance of the owner device 502 with a pair of keys for the digital twin instance (twin.pk and twin.sk) (box 610). The twin server 506 then sends a twin session confirmation (communication signal 612) to the vehicle server 504. The twin session confirmation includes the twin instance public key (twin.pk). The vehicle server 504 forwards the twin session confirmation and twin instance public key (twin.pk) (communication signal 614) to the owner device 502. The owner device uses its private key (owner.sk) to sign a certificate for the twin's public key and send it back (communication signal 616) to the vehicle server 504. The vehicle server 504 then forwards the certificate back to the twin server (communication signal 618), indicating the establishment of the twin session.

The owner device 502 then sends a message (communication signal 620) to the delegate entity 508 to notify the delegate entity 508 that a session has been opened to allow it to be enrolled at the twin server 506. The message includes the owner.pk, the twin.pk and a delegate userID. The delegate entity 508 receiving the message has an already established delegate userID and delegate password, delegate.pk and delegate.sk. On receiving the enrollment message from the owner device 502, the delegate entity 508 performs a user authentication (box 622), if necessary, to allow the delegated userID be used.

The delegate entity 508 then sends an enrollment signal (communication signal 624) to the twin server 506. The twin server 506 notifies the vehicle server 504 of the enrollment (communication signal 626) and the vehicle server 504 sends an acknowledgment (communication signal 628) back to the twin server 506. The twin server 506 stores the owner.pk and the delegate.pk and creates a link session for the delegate entity (box 630). The twin server 506 further uses its private key (twin.sk) to sign a certificate for the delegate entity's public key (delegate.pk). Enrollment confirmations (communication signals 632 and 634), including the signed certificate, are sent from the twin server 506 to the delegate entity 508 and vehicle server 504, respectively, to confirm enrollment of the delegate entity 508. The vehicle server 504 forwards the enrollment confirmation (communication signal 636) to the owner device 502. When the enrollment process has been completed, the delegate entity 508 can control the twin instance on the twin server 506.

Figure 7:
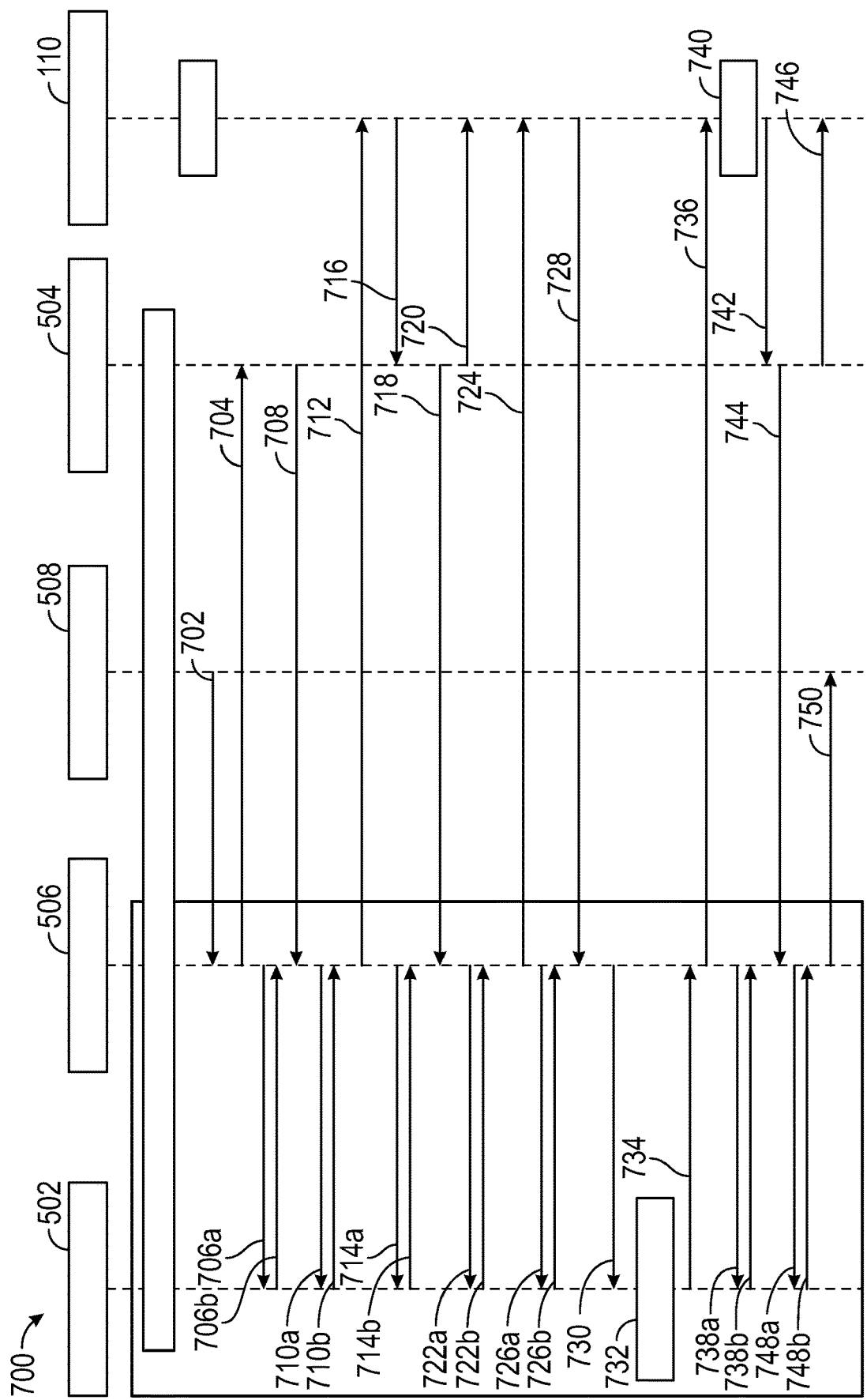
FIG. 7 shows a communication diagram for key sharing using the twin server once the delegate entity has been enrolled.

FIG. 7 shows a communication diagram 700 for key sharing using the twin server 506 once the delegate entity 508 has been enrolled. The delegate entity 508 shares the delegate key to a vehicle user device 110 via the twin server 506. At the back end, the twin server 506 can synchronize with the owner device.

The delegate entity 508 sends a sharing request (communication signal 702) to the twin server 506, which sends a sharing session request (communication signal 704) to the vehicle server 504. The twin server 506 can also synchronize the session request with the owner device 502 (communication signals 706a and 706b) through an established secure communication channel. The vehicle server 504 establishes the session (communication signal 708) with the twin server 506. The twin server 506 can also synchronize the established session with the owner device 502 (communication signals 710a and 710b).

The twin server 506 sends a sharing URL (communication signal 712) to the vehicle user device 110 to allow the vehicle user device to receive a copy of the delegate key. The sharing of the URL is synchronized with the owner device (communication signals 714a and 714b). The vehicle user device 110 redeems the URL (communication signal 716) at the vehicle server 504. The remote server sends notification signals to the twin server 506 (communication signal 718) and to the vehicle user device 110 (communication signal 720) to verify that a sharing session has been created. The twin server 506 can also synchronize the creation of the sharing session with the owner device 502 (communication signals 722a and 722b).

The twin server 506 sends a key creation request (communication signal 724) to the vehicle user device 110, synchronizing this key creation request with the owner device 502 (communication signals 726a and 726b). The vehicle user device 110 sends a signed request back to the twin server 506 (communication signal 728). The twin server forwards the signed request to the owner device 502 (communication signal 730). The owner device 502 signs a shared digital key (box 732) and shares the digital key with the twin server 506 (communication signal 734). The twin server 506 shares the digital key with the vehicle user device 110 (communication signal 736) and synchronizes with the owner device 502 to allow the owner device to know that the digital key is now shared with the vehicle user device 110 (communication signals 738a and 738b).

The vehicle user device 110 imports the shared key (box 740) and sends a track key signal (communication signal 742) to the vehicle server 504, which sends a notification (communication signal 744) to the twin server 506. A notification (communication signal 744) is sent from the vehicle server 504 to the twin server 506, and a notification (communication signal 746) is sent from the vehicle server 504 to the vehicle user device 110. The key tracking state can be synchronized with the owner device 502 (communication signals 748a and 748b) and a key tracking signal (communication signal 750) is sent to the delegate entity 508.

While communication signals (706a, 706b, 710a, 710b, 714a, 714b, 722a, 722b, 726a, 726b, 728, 732, 738b, 738b, 748a, 748b) used in synchronization between the twin server 506 and the owner device 502 are shown, not all of these communication signals are necessary for the operation of the key sharing process via the twin server 506. Communication signals 730 and 734 are needed in order to allow the owner device 502 to be aware of the key request and to create or approve of a shared digital key (box 734).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of sharing a digital key for a vehicle, comprising:
   sending a list of entitlements from a first digital key device to a vehicle server, the first digital key device having the digital key stored thereon;
   receiving from the vehicle server an active entitlement;
   generating a sharing entitlement at the first digital key device that does not conflict with the active entitlement;
   sending a request for a key sharing session from the first digital key device to the vehicle server;
   commencing the key sharing session at the vehicle server;
   sharing the digital key from the first digital key device to a second digital key device;
   sending a track key signal from the second digital key device to the vehicle server;
   validating the sharing entitlement at the vehicle server; and
   ending the key sharing session at the vehicle server.

2. The method of claim 1, further comprising granting, via the vehicle server, exclusive rights to the first digital key device to share the digital key during the key sharing session.

3. The method of claim 1, further comprising sharing the digital key by tracking active entitlements for the digital key.

4. The method of claim 1, wherein the first digital key device is a delegate device, further comprising registering the digital key stored on the delegate device at the vehicle.

5. The method of claim 4, wherein the digital key stored on the delegate device includes a certificate including an owner signature from an owner device that entitles the delegate device to share the digital key.

6. The method of claim 5, wherein registering the digital key stored on the delegate device at the vehicle further comprises verifying the owner signature from the digital key.

7. The method of claim 1, further comprising sharing the digital key to a twin server, creating a digital twin of the first digital key device at the twin server and sharing the digital key using the digital twin at the twin server.

8. The method of claim 7, further comprising sending a key sharing request from the twin server to the first digital key device, creating a shared digital key at the first digital key device and sending the shared digital key from the first digital key device to the twin server, wherein the twin server sends the shared digital key to the second digital key device.

9. The method of claim 1, further comprising using the shared key at the second digital key device to perform an operation at the vehicle.

10. A system for sharing a digital key for a vehicle, comprising:
    a first digital key device having the digital key stored thereon;
    a second digital key device; and
    a vehicle server;
    wherein the first digital key device is configured to send a list of entitlements to the vehicle server, receive an active entitlement from the vehicle server, generate a sharing entitlement that does not conflict with the active entitlement, send a request for a key sharing session to the vehicle server, and share the digital key to the second digital key device,
    the vehicle server is configured to send the active entitlement to the first digital key device in response to receiving the list of entitlements, commence the key sharing session in response to the request from the first digital key device, validate the sharing entitlement, and end the key sharing session, and
    the second digital key device is configured to send a track key signal to the vehicle server.

11. The system of claim 10, wherein the vehicle server is configured to grant exclusive rights to the first digital key device to share the digital key during the key sharing session.

12. The system of claim 10, wherein the vehicle server is configured to track active entitlements for the digital key.

13. The system of claim 10, wherein the first digital key device is a delegate device and the vehicle server is configured to register the digital key stored on the delegate device at the vehicle.

14. The system of claim 13, wherein the digital key stored on the delegate device includes a certificate including an owner signature from an owner device that entitles the delegate device to share the digital key.

15. The system of claim 14, wherein the vehicle is configured to register the delegate device by verifying the owner signature from the digital key stored on the delegate device.

16. The system of claim 10, further comprising a twin server configured to receive the digital key from the first digital key device, create a digital twin of the digital key and share the digital key using the digital twin.

17. The system of claim 16, wherein the twin server is configured to send a key sharing request to the first digital key device and the first digital key device is configured to create a shared digital key and send the shared digital key to the twin server in response to the key sharing request, wherein the twin server sends the shared digital key to the second digital key device.

18. The system of claim 10, wherein the second digital key device is configured to use the shared key to perform an operation the vehicle.

* * * * *